United States Patent [19]

Perryman

[11] Patent Number: 5,027,971
[45] Date of Patent: Jul. 2, 1991

[54] REACTOR VESSEL

[75] Inventor: George B. Perryman, Richmond, Tex.

[73] Assignee: The B.F. Goodrich Company, Akron, Ohio

[21] Appl. No.: 594,493

[22] Filed: Oct. 4, 1990

[51] Int. Cl.$^5$ .............................................. B65D 25/18
[52] U.S. Cl. .................................. 220/426; 220/445; 29/455.1; 165/154
[58] Field of Search ............... 220/426, 445, 446, 447; 29/455.1, 456; 165/154

[56] References Cited

U.S. PATENT DOCUMENTS

| | | | |
|---|---|---|---|
| 3,291,333 | 12/1966 | House | 220/426 |
| 3,298,790 | 1/1967 | Benzinger | 220/426 |
| 3,780,900 | 12/1973 | Yamamoto | 220/426 |
| 3,822,186 | 7/1974 | Rajakovics | 220/445 |
| 3,827,135 | 8/1974 | Yamamoto | 220/445 |
| 4,054,981 | 10/1977 | Bridgegum | 220/426 |
| 4,140,073 | 2/1979 | Androulakis | 220/426 |

Primary Examiner—Joseph Man-Fu Moy
Attorney, Agent, or Firm—Joseph Januszkiewicz

[57] ABSTRACT

A pressure proof reactor vessel and the method of making such vessel wherein the vessel has a cylindrical one-piece outer shell and a cylindrical one-piece cylindrical inner shell, which inner shell has a smooth continuous interior surface spaced radially inwardly from the outer wall and concentric thereto. The outer cylindrical shell is formed from a one-piece material with its radial thickness being substantially greater than the radial thickness of the inner cylindrical shell. Support means in the form of a spiral or vertically disposed is positioned in the space between the cylindrical outer surface wall of the inner shell and the cylindrical outer shell defining a pathway for the flow of coolant between the outer wall and the inner wall. The support means is secured to the inner surface of the one-piece cylindrical outer shell while the inner shell is plug welded to the support means.

14 Claims, 4 Drawing Sheets

REACTOR VESSEL

BACKGROUND OF THE INVENTION

This invention relates to a polymerization or reactor vessel or tank structure for use in a suspension polymerization process for the manufacture of polyvinyl chloride or vinyl chloride.

In the polymerization process there is an excessive heat build up due to the reaction process and it is necessary to remove such heat to control the speed of reaction process. As larger closed apparatus or vessels are used to more economically manufacture the end product it has become necessary to use thicker walls to provide the necessary strength to withstand the increase in pressure. However with this increase in size of vessel and wall thickness there is also a substantial increase in the need to more efficiently remove the heat to properly control the reaction process.

The prior art provision of removing heat in the form of cooling tubs within the reactor vessel is unsatisfactory because of the difficulty of cleaning the interior walls of the vessel and the exterior walls of the cooling tubs due to polymer adhesion thereto and the resulting build-up or accumlation thereon. The provision of external cooling jacket encompasssing the reactor vessel has presented the problem of not providing sufficient cooling capacity because of the thickness of the vessel wall prevents efficient cooling. The instant invention provides an internal cooling jacket with a thin innermost wall with a novel, economic and unique means of securing such inner wall to the reactor's outer thick wall presenting a smooth continuous inner wall surface assuring efficient cooling which inhibits the unsatisfactory build-up of polymer adhesion and accumulation on the inner vessel wall to thereby allow the building of larger reactor vessels.

SUMMARY OF THE INVENTION

A pressure proof reactor vessel and the method of making such vessel wherein the reactor vessel has an outer cylindrical shell encompassing a cylindrical inner shell. Either a spiral support or vertical supports are attached to the inner surface of the outer shell and thence the inner shell is plug welded to the supports to encompass such inner shell to define a single flow path or plural flow paths for circulating coolant to effect proper cooling. The cross sectional thickness of the wall of the inner shell is substantially less than the cross sectional thickness of the outer shell.

DETAILED DESCRIPTION

Figure 1:
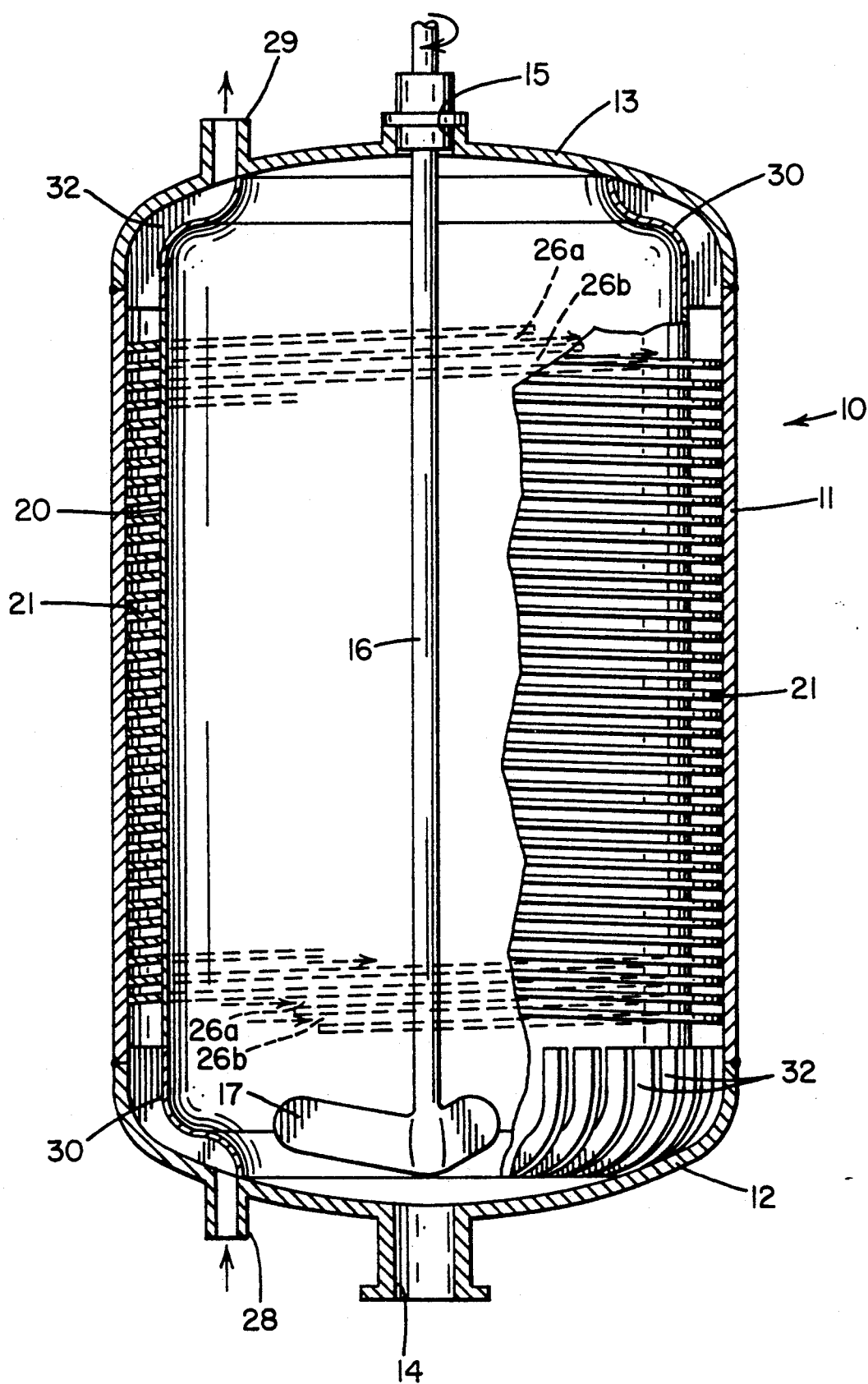
FIG. 1 is a side elevational view partly in cross-section of a reactor vessel.
Figure 2:
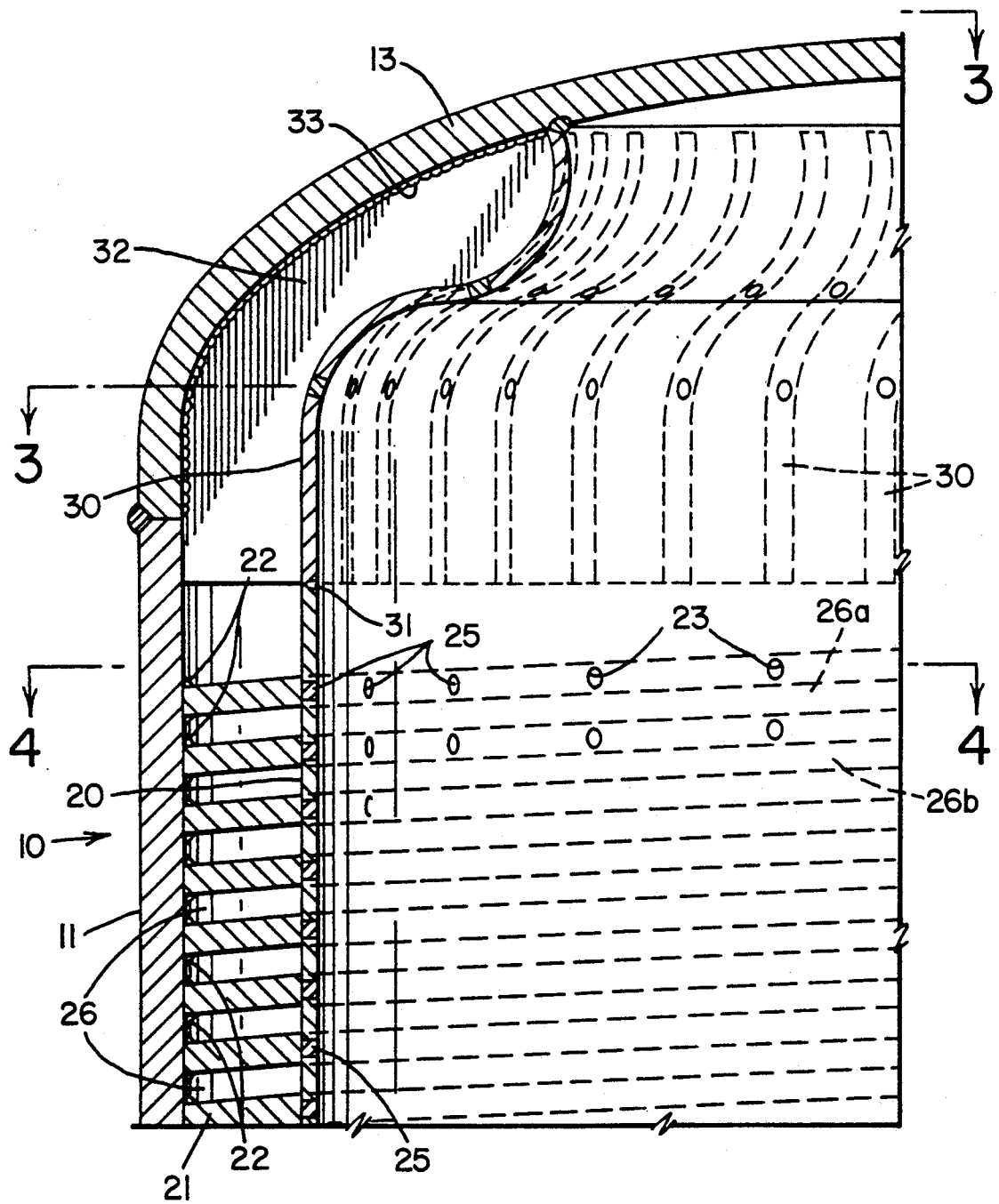
FIG. 2 is an enlarged fragmentary sectional view of an upper portion of the reactor vessel shown in FIG. 1.
Figure 3:
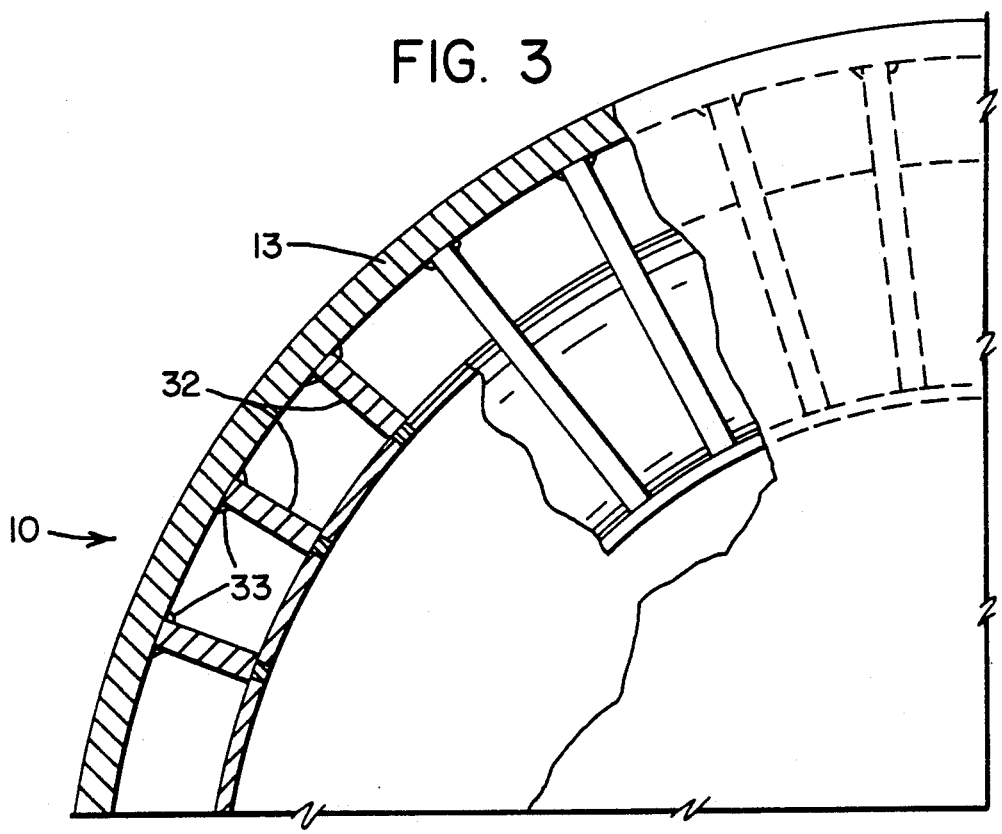
FIG. 3 is a plan view partly in cross-section taken on line 3—3 of FIG. 2.
Figure 4:
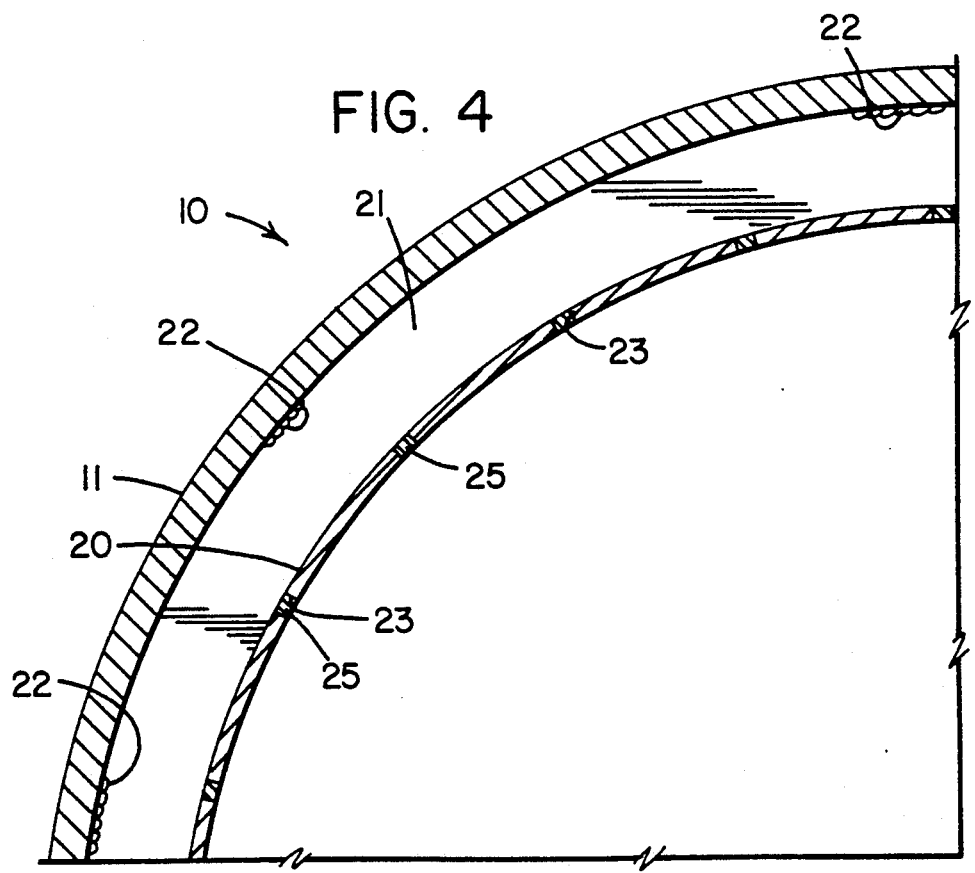
FIG. 4 is an enlarged plan view of a portion of the wall of the vessel taken on line 4—4 of FIG. 2.

Referring to the drawings wherein like reference numerals designate like or corresponding parts throughout the several views, there is shown in FIGS. 1 and 2 a closed reactor apparatus, vessel or tank 10 having a generally cylindrical outer wall, outer vessel or outer shell 11 of sheet metal with its lower end closed by a lower semi-spherical or dish-like member or cap 12 and its upper end closed by an upper semi-spherical or dish-like member or cap 13. Such dish-like members 12 and 13 are suitably welded to the outer shell or outer vessel 11 to form the closed reactor tank or vessel. The lower dish-like member 12 has an outlet port 14 which is sutably controlled by a valve means not shown. The upper dish like member 13 has a central opening 15 through which extends a shaft 16 having mounted on its one end a paddle 17 that is suitably rotated to perform a mixing function within the reactor tank. Such upper dish like member 13 also has suitable (manhole) openings not shown for charging or introducing products into the reactor vessel.

A generally cylindrical inner wall, inner vessel, or inner homogeneous shell 20 of thin sheet metal relative to the thickness of the outer shell 11 is concentrically mounted within such outer shell and having its outer wall surface spaced from the inner wall surface of the outer shell 11 to form a central chamber as distingushed from a passageway formed by a longitudinally extending tube. A continuous spiral support or baffle 21 encircles such inner cylindrical inner wall, vessel or inner shell 20 and extends from the inner wall surface of the outer shell 11 to the outer wall surface of the inner shell 20. Such spiral support 21 is spot welded along spaced portions of its outer periphery to the outer wall of the outer shell 11 as at 22. As shown in FIG. 2, the support 21 is spot welded along its upper and lower periphery to such outer shell 11. Such welding may be a continuous weld along the full continuous outer periphery of the support 21 where it meets the outer wall suface of the outer shell 11. Such support 21 forms a radial partition or wall that is substantially normal to the shell 11.

The inner shell or inner vessel 20 has a plurality of circumferentially spaced and vetically spaced rows of holes 23 therethrough which are in alignment with the inner peripheral edge of the spiral support 21 such that by plug welding the inner shell 20 to the inner edge of the support 21 as at 25, the inner shell is firmly secured to th support 21 to form a spiral flow path, pathway or passageway that extends from the upper end portion of the reactor vessel spirally to the lower end portion of the reactor vessel. The preferred embodiment is to have the spiral support 21 formed as a double spiral passageway rather than a single continuous spiral passageway such that an inlet 28 (FIG. 1) at the lower end of the reactor tank communicates with an adjacent pair of passageways 26a and 26b (FIG. 1), which passageways 26a and 26b communicate via their terminal ends with an outlet 29.

As used herein, a plug weld is a generally circular weld through a hole in a first member of a lap or T-joint fusing such first member to another member. The wall of the hole does not have to be parallel but is completely filled with weld metal so that the inner wall surface of the inner vessel can have a smooth finish that is continuous with the inner wall surface of the inner vessel. (A fillet welded hole or a spot weld should not be construed as conforming to this definition.)

A spot weld is made between or upon overlapping members in which coalescence may start and occur on the faying surfaces or may proceed from the surface of one member to the other member. The weld cross section (in plan view) is approximately circular.

A faying surface is a mating surface of a member which is in contact or in close proximity to another member to which it is to be joined. A fillet weld is approximately triangular in cross section joining two surfaces approximately at right angles to each other in a lap joint, T-joint or corne joint.

Figure 5:
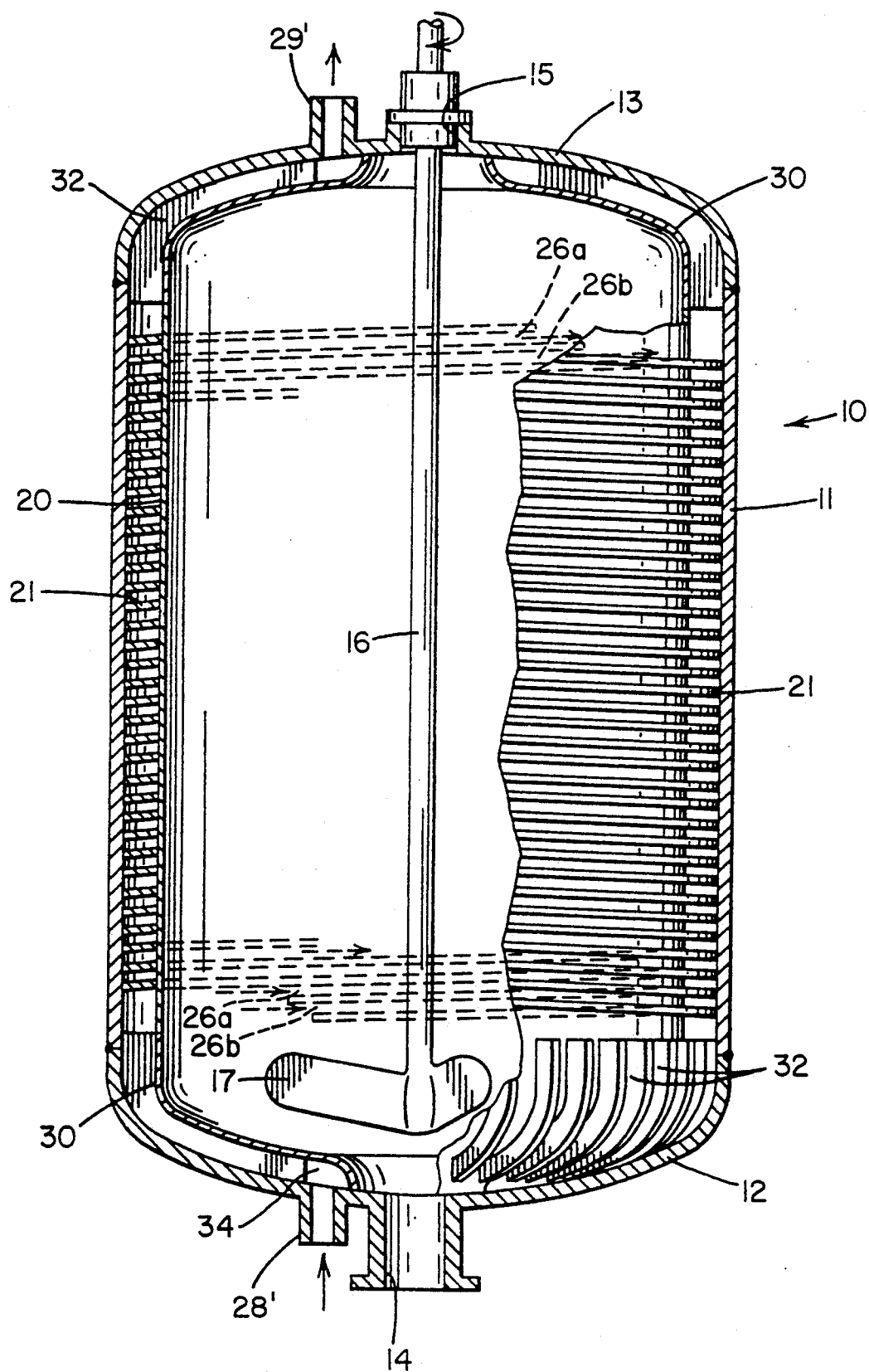

In constructing the reactor tank described above, the outer shell 11 is first formed with the inside diameter rolled to a very close tolerance. The spiral support or baffle 21 on suitable spacing with a pitch is attached to the inside wall surface of the outer vessel 11 with a fillet weld. The inner shell or vessel 20 is then provided with vertical and circumferentially spaced holes on a spiral to be in alignment with the inside edge of the support 21 so that the plug welding that is next used will attach the inner vessel 20 to the spiral baffle 21. Flanged plate members 30 are then fastened to the inner vessel as by welds 31 (FIG. 2), after which a plurality of vertical (as viewed in FIGS. 1 and 2) gussets or plate members 32 are then welded to the respective dish-like members 12 and 13 as by fillet welds 33. The dish-like members 12 and 13 are then welded to the outer vessel or outer shell 11 with suitable openings connected to the chambers formed by such gussets to assure a flow of coolant into the tank. It is to be noted that the tank 10 is cooled mainly by the coolant fluid flowing via inlet 28, passageways 26a and 26b and outlet 29. The size of the outlet 29 and inlet 28 can determine the number of parallel spiral passageways 26 that can encircle the inner shell 20. As disclosed, the peferred embodiment is to have a pair of parallel passageways 26 (26a and 26b) encircling the inner shell from the inlet 28 to the outlet 29. The respective chambers formed by the lower and upper dish-like members 12 and 13 are cooled by the flow rate and location of the inlet 28 and the outlet 29. If desired, the respective terminal portion of the dish-like members 12 and 13 may have the respective flanged plate members 30 and gussets 32 of shorter dimension as shown in FIG. 5 to create a direct flow of coolant from the inlet 28' throughout the lower dish-like member 12 before entering the passageways 26a and 26b for outflow via outlet 29'. As seen in FIG. 5, the lower portion of lower dish-like member 12 has a passageway or manifold 34 that facilitates the flow of coolant from the inlet 28' throughout the dish-like member 12 prior to flow through the passageways 26a and 26b.

Various modifications and variations of the present invention are possible in the light of the above teachings. It is, therefore, to be understood that within the scope of the appended claims the invention may be practied otherwise than as specifically described.

What is claimed is:

1. A reaction apparatus comprising a pressure proof vessel with a large central chamber for use under relatively high pressures, said apparatus being formed by:
   a generally cylindrical outer wall; a generally cylindrical inner wall having a smooth interior surface; said inner wall positioned substantially concentrically within said outer wall and spaced from said outer wall; said space between said outer wall and said inner wall being separated from the interior chamber formed by said inner wall; the thickness of said inner wall being substantially thinner than the thickness of said outer wall; a support positioned in said space; said support including a plurality of support portions that extend substantially radially from said outer wall to said inner wall; said plurality of support portions extending generally parallel to each other and being separated to form flow paths therebetween; weld metal securing said outer wall to said support portions; plug weld metal securing said inne wall to said support portions; said plug welds in said inner wall being circumferentially spaced and vertical spaced; and said outer wall having at least a pair of flow openings in said outer wall leading to said flow paths.

2. A reaction apparatus as set forth in claim 1, wherein said inner wall has a plurality of holes therein that are circumferentially spaced and vertically spaced that receives said plug weld metal to secure said inner wall to said support portions.

3. A reaction apparatus as set forth in claim 2 wherein said support portions extend circumferentially around said inner wall to form spiral flow paths.

4. A reaction apparatus as set forth in claim 2 wherein said support portions extend in a direction generally parallel to the axis of said inner shell 5. A reactor tank with a large central chamber having a flow pathway along its outer periphery for the flow of coolant medium therethrough comprising an inner homogeneous shell of thin sheet metal, an outer shell fo sheet metal thicker than said inner shell, said inner shell having an outer wall, said outer shell having an inner wall, an intermediate rib projecting radially outwardly from said outer wall to said inner wall to define a pathway for the flow of coolant between said inner shell and said outer shell to cool said inner shell, said intermediate ribs being welded to said inner wall surface of said outer shell, and said inner shell bing plug welded to said intermediate ribs to secure said ribs to said inner shell to define said flow pathway.

6. A reactor tank as set forth in claim 5 wherein said intermediate rib has a spiral configuration relative to said inner shell and said outer shell to make said flow pathway a spiral flow pathway.

7. A reactor tank as set forth in claim 6 wherein said spiral flow pathway is a single flow path.

8. A reactor tank as set forth in claim 5, wherein said intermediate rib projecting radially outwardly from said outer wall to said inner wall is composed of a plurality of cooperative ribs to define separate plural flow paths.

9. A pressure proof reactor vessel having a cylindrical inner homogeneous inner shell of thin sheet metal, said inner shell having an inner and outer wall surface; a cylindrical outer shell of thicker sheet metal, said outer shell having an inner and an outer wall surface; said shells being concentric with each other and having a clearance space therebetween, support means positioned in said space between said shells defining a pathway for the flow of coolant between said outer wall of said inner shell and said inner wall of said outer shell; said outer shell being welded to said support means to provide a continuous seam therebetween, and said inner shell having a plurality of plug welds interconnecting said inner shell to said support means.

10. A method of making a reactor vessel comprising the steps of forming an outer cylindrical shell, welding a continuous spiral support to the inner wall surface of said outer shell, forming an inner cylindrical shell against said spiral support by pressing the outer surface of said inner shell firmly against said continuous spiral support, plug welding said inner shell to said spiral support to form a continuous spiral flow path around said inner shell in cooperation with said spiral support, providing an upper dish-like member cap and a lower dish like member to said outer cylindrical shell to form said closed reactor vessel, and providing an inlet and an outlet port to said reactor vessel that communicates with said spiral flow path.

11. A method of making a reactor vessel as set forth in claim 10 wherein the wall thickness of said inner shell is substantially less than the wall thickness of said outer shell.

12. A method of making a reactor vessel as set forth in claim 11 wherein said outer shell is made from a single continuous sheet of metal with a single lengthwise weld.

13. A method of making a reactor vessel comprising the steps of forming an outer cylindrical shell, welding a plurality of spiral supports to the inner wall surface of said outer shell, forming an inner cylindrical shell against said spiral supports by pessing the outer surface of said inner shell firmly against said spiral supports, plug welding said inner shell to said spiral supports to form separate plural flow channels around said inner shell, securing an upper and lower cap to said outer shell to form a closed reactor vessel, and providing an inlet port and an outlet port to said reactor vessel that communicates with said flow channels.

14. A method of making a reactor vessel as set forth in claim 13 wherein said outer shell's wall thickness is substantially greater than the wall thickness of said inner shell.

* * * * *